United States Patent [19]

Hallum

[11] 4,316,509

[45] Feb. 23, 1982

[54] AGRICULTURAL VEHICLE FOR FORMING WATER RINGS

[76] Inventor: Morris M. Hallum, 3558 Sunset Ave., P.O. Box 86, Scottsmoor, Fla. 32775

[21] Appl. No.: 77,101

[22] Filed: Sep. 19, 1979

[51] Int. Cl.³ .................... A01B 59/046; A01B 79/00
[52] U.S. Cl. ........................................ 172/297; 172/1; 172/451
[58] Field of Search .................. 172/24, 1, 42, 297, 172/308, 451, 570, 574, 603, 677, 711, 742, 800

[56] References Cited

U.S. PATENT DOCUMENTS

| 505,965 | 10/1893 | Smyth | 172/24 |
| 889,885 | 6/1908 | Anderson et al. | 172/570 |
| 1,456,817 | 5/1923 | Morton | 172/308 |
| 1,637,525 | 8/1927 | Huston | 172/308 |
| 1,656,354 | 1/1928 | Hester | 172/308 |
| 2,041,832 | 5/1936 | Hester | 172/308 |
| 2,525,369 | 10/1950 | Payne | 172/308 |
| 2,528,352 | 10/1950 | Faucett | 172/308 |
| 2,843,033 | 7/1958 | Meyer | 172/24 |

FOREIGN PATENT DOCUMENTS

| 239662 | 12/1959 | Australia | 172/308 |
| 245124 | 7/1960 | Australia | 172/451 |
| 113007 | 3/1968 | Norway | 172/677 |
| 679663 | 9/1952 | United Kingdom | 172/42 |

*Primary Examiner*—Richard T. Stouffer
*Attorney, Agent, or Firm*—Duckworth, Allen, Dyer & Pettis

[57] ABSTRACT

An agricultural vehicle for forming a substantially circular water ring in the soil for the planting of a young tree or the like includes a vehicle body having an operator position, a pair of wheels supporting the body and an engine for rotating the wheels to move the body across the soil in a direction of travel responsive to control by the operator. A disk plow blade, having a front face and a peripheral edge adapted to engage and turn up the soil is coupled to the vehicle by a boom supported by the vehicle body, the blades being spaced from, and aside, the operator position at a point generally normal from the operator position with respect to the direction of travel, thereby permitting the operator to view the blade during engagement with the soil such that a circular water ring may be formed in the soil by movement of the vehicle in a generally circular direction of travel causing the blade to push up the soil to form the water ring.

9 Claims, 4 Drawing Figures

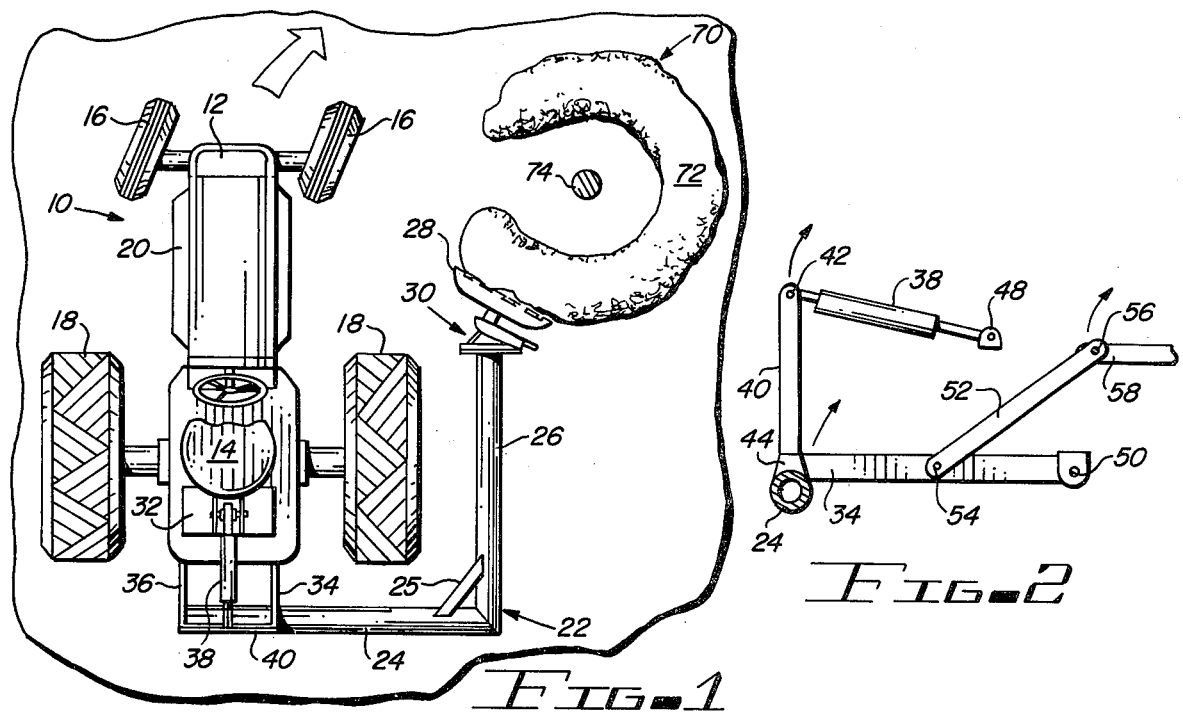
FIG-1
FIG-2
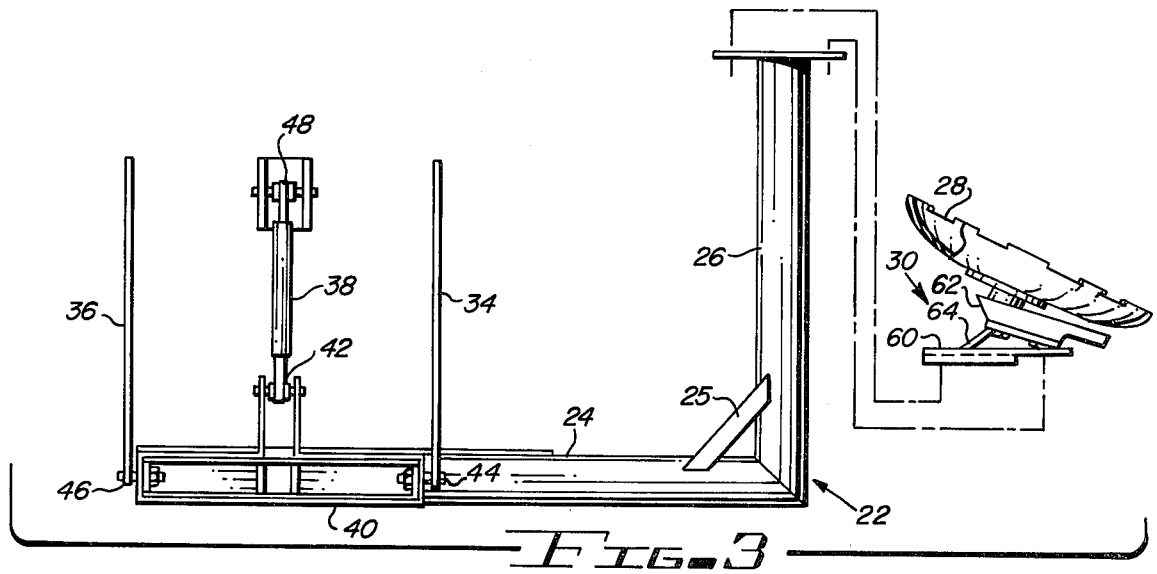
FIG-3
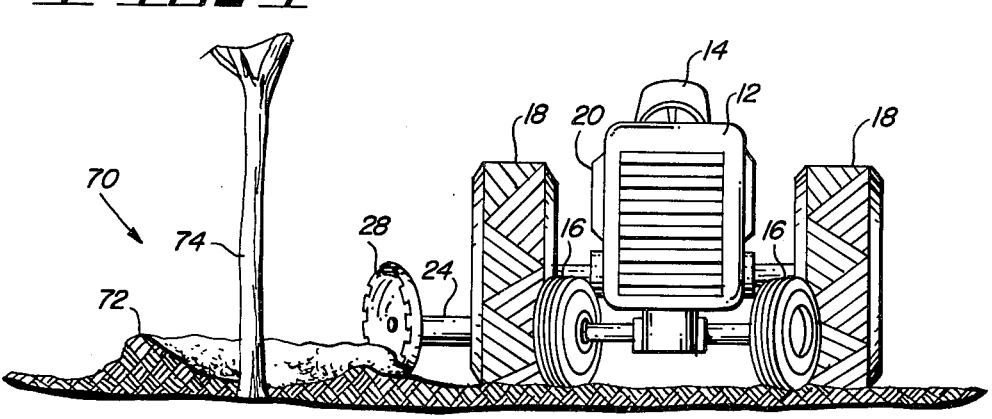
FIG-4

AGRICULTURAL VEHICLE FOR FORMING WATER RINGS

BACKGROUND OF THE INVENTION

1. Field of the Invention

The present invention relates generally to agricultural implements and vehicles, and particularly to such implements and vehicles as are adapted to form water rings in the soil for young trees or the like.

2. Description of the Prior Art

In the planting of young fruit trees (such as citrus), it is necessary to frequently water its roots to insure that the roots take hold and the tree survives the transplant.

In certain areas, the soil is relatively impervious, and water tends to run across the surface faster than it is soaked into the soil. Under these conditions, it is necessary to provide some means of retaining the water until sufficiently penetrated to the roots, in the desired manner.

To this end, it has been customary in the past, to bank impervious soil into an annular "water ring", and thereafter planting the tree in the middle of the ring. Typically, this has been done manually.

There have been suggestions in the prior art for providing plows and other agricultural implements designed to create hills for row crops and the like. For example, De Yone, in U.S. Pat. No. 1,785,676, discloses a hilling attachment for cultivators, to "hill up" the rows of plants being cultivated. A similar arrangement is disclosed in U.S. Pat. No. 2,757,593 to Bowman.

Other prior art of interest includes the following U.S. Pat. Nos.: 2,453,197 to Clay; 736,440 to Pierce; 963,525 to Daly; 1,124,703 to Clare; 556,972 to Hardy; 728,359 to Bolser; 2,452,212 to Shimmon; 1,625,379 to Sweeney; 85,957 to Pitcher et al.; and 1,100,589 to Long.

SUMMARY OF THE INVENTION

The present invention contemplates an agricultural vehicle for forming a substantially circular water ring in the soil for the planting of a young tree or the like. In accordance with the present invention, the vehicle comprises a body having an operator position and at least one pair of wheels supporting the body, with an engine for rotating the wheels to move the body across the soil in a direction of travel responsive to control by an operator in the operator position.

In accordance with the present invention, the vehicle includes a blade having a front face and a peripheral edge adapted to engage and turn up the soil. A boom is coupled to the vehicle body and supports the blade aside and spaced from the operator position at a point generally normal from the operator position with respect to the direction of travel, thereby permitting the operator to view the blade during engagement with the soil. The blade is supported by the boom such that the face is at a substantial angle with respect to the direction of travel, with the blade aside, and spaced from the vehicle, including the adjacent rear wheel. The vehicle further includes means for raising and lowering the blade.

In use, the desired water ring is formed in the soil by movement of the vehicle in a generally circular direction of travel, causing the blade to push up the soil across the face of the blade and form the ring under observation of the operator.

In accordance with a preferred embodiment of the present invention, the boom arm comprises an L-shaped member formed of two boom arm portions, one portion being coupled to the vehicle body at the rear thereof. The means for raising and lowering the boom suitably comprises a three-point couple between one portion of the L-shaped boom arm and the rear of the vehicle body, such that the entire boom arm-blade assembly may be raised and lowered from the rear of the vehicle. The three-point couple includes a pair of parallel struts and a third strut pivotably coupled to the boom arm and a corresponding bracket on one end, and at the other end to the vehicle, with at least one connecting rod coupled intermediate between the ends of one strut and a swing arm coupled to the connecting rod for raising and lowering the entire couple-boom arm-blade assembly.

Preferably, the blade is coupled at the extremity of the boom arm in such a way as to provide a degree of "give" with respect to the boom arm. To this end, a shock absorber may be positioned between the extremity of the boom arm and the blade.

During the circular motion of the vehicle while forming the water rings, the face of the blade is substantially perpendicular to the changing direction of travel, thus presenting the face of the blade directly to the soil to cause the soil to be scraped forward and upwardly across the face of the blade, and then pushed aside by virtue of the circular motion of the blade with the vehicle, resulting in an annular ring of soil about a central portion which is well adapted for the planting of a young tree.

THE DRAWING

FIG. 1 is a top plan illustration of the combination vehicle and implement in accordance with the present invention.

FIG. 2 is a side view of a portion of the vehicle and implement combination of FIG. 1, further detailing the means for raising and lowering the boom arm.

FIG. 3 is a top plan view of the boom arm and a portion of the three-point couple used for raising and lowering the boom arm.

FIG. 4 is a front elevation of a vehicle-implement combination in accordance with the present invention.

DETAILED DESCRIPTION

The preferred embodiment of the present invention will now be described with reference to the drawings.

Noting FIGS. 1 and 4, the present invention contemplates an agricultural vehicle 10, such as a conventional tractor or the like, having a body 12 and an associated operator position 14. The vehicle 10 is provided with front and rear pairs of wheels, 16 and 18 respectively, and an engine 20. As noted above, the vehicle 10 described thus far is a conventional tractor or the like.

In accordance with the present invention, the vehicle 10 is provided with an agricultural implement including a disk plow blade 28 side mounted aside the operator position for forming annular water rings in the soil to facilitate the planting of young trees. In accordance with the specific embodiment shown in the drawings, the vehicle 10 includes a boom 22 consisting of an L-shaped boom arm formed of two substantially perpendicular portions 24, 26 with a brace 25 therebetween. However, it will be understood that the boom 22 can be formed of one continuous pipe having an angular bend.

As is shown in FIGS. 1 and 4, the disk plow blade 28 is serrated about its peripheral edge, and is mounted by a shock 30 to the forward extremity of the second portion of the L-shaped boom arm 22.

Further, in accordance with the present invention, the vehicle 10 is provided with means for raising and lowering the boom arm 22. In FIG. 1, this means is referred to generally by the reference numeral 32, and is described in greater detail with reference to FIGS. 2 and 3.

Now turning to FIGS. 2 and 3, the raising and lowering means includes a pair of parallel struts 34, 36, each pair of struts being coupled to the boom arm portion 24 at a pivot 44, and at the other extremity to a pivot 50 on the undercarriage of the vehicle body 12. This structure is further provided with a bracket 40 extending upwardly from the boom arm portion 24 in a vertical direction, and being pivotably coupled at 42 to a third strut 38, the other extremity of that third strut being pivotably coupled at 48 to an upper portion of the rear of the vehicle body 12.

The vehicle 10 is further provided with at least one connecting rod 52 pivotably coupled at one end to one of the pair of struts 34 between the extremities thereof at pivot point 54, and pivotably coupled at the other extremity 56 to a swing arm 58. Typically, the swing arm 58 comprises the conventional hydraulic take-off from a tractor suitable for use as the vehicle 10. Thus, as the swing arm 58 is rotated upwardly, the entire assembly, including the connecting arm 52, the struts 34, 36 and 38, as well as the boom arm 22, the bracket 40 and ultimately the blade 28 are rotated upward, such that the blade 28 is out of engagement with the soil.

With specific reference to FIG. 3, the blade 28 is attached to the extremity of the second portion 26 of the boom arm 22 via a shock absorber 30. The shock absorber includes a first plate 60 adapted to be attached to the extremity of the boom arm portion 26, a second plate 62 spaced from the first plate and joined to the disk plate 28, and a brace 64 coupled between the first and second plates so as to form a substantially triangular configuration between the three elements. In use, the combination of the first and second plates 60, 62 and the brace 64 provide a degree of "give" to the blade with respect to the boom arm portion 26.

The manner in which the vehicle 10 is used to form water rings for young trees will now be described with reference to FIGS. 1 and 4.

Initially, the vehicle 10 is brought adjacent to a point where a water ring 70 is to be formed. As the vehicle travels from one point to another, the swing arm 58 is actuated in a conventional manner to raise the boom arm 22 and thus disengage the disk plow blade from the soil. When the vehicle arrives at the location where a water ring is to be formed, and typically, a number of such rings would be formed sequentially along a piece of ground which is to constitute a new grove or orchard, the swing arm is actuated downward, permitting the boom arm 22 to rotate downward toward the soil, thereby allowing the disk blade 28 to engage the soil in the desired manner. As is shown in FIG. 1, the blade 28 is positioned such that the lower extremity of the periphery is slightly forward with respect to the upper edge periphery of the blade, the entire blade being serrated in a conventional manner.

The vehicle 10 is then driven in a generally circular pattern while engaging the blade in the soil, such that the face of the blade is generally perpendicular to the changing direction of travel while the vehicle body 12 is moving through the circular pattern (note arrows in FIG. 1 illustrating the changing direction of travel). Accordingly, the blade 28 pushes up the soil across the face of the blade forming an annular ring having a crest, shown as element 52 in the drawing, and encircling a central portion which is suitable for planting a young tree. While the tree may not be planted in the center of the ring 70 at the time the ring is formed, the position of the tree is shown by a circle, element 74 in FIG. 1.

The most important aspect of the present invention is the manner in which the disk plow blade is positioned substantially transverse to the direction of travel at a point generally aside the operator position, thereby permitting the operator to view the forming of the water ring and control the direction of travel of the vehicle in the desired manner. Further, by positioning of the plow blade at a point spaced from, and generally aside, the operator position, a lesser amount of space is required for turning the vehicle body 12 in the circular pattern necessary to form the water ring. That is, a much smaller turning radius is obtainable in the configuration of the present invention, than is otherwise obtainable with respect to prior art disk plow arrangements in which the plow is located behind the prime mover.

I claim:

1. An agricultural vehicle for forming a substantially circular water ring in the soil for the planting of a young tree or the like comprising:

a vehicle body having an operator position;

a pair of rear drive wheels supporting said body;

engine means for rotating said wheels to move said body across the soil in a direction of travel responsive to control by the operator in said operator position;

a single blade having a front face directed generally forwardly and away from said vehicle body, said blade having a peripheral edge adapted to engage and turn up the soil;

a boom including a first portion extending normal to said direction of travel and a second portion extending forwardly from said first portion substantially parallel with the direction of travel, said first portion coupled with said vehicle body rearwardly of said operator position and said rear drive wheels with said second portion extending forwardly of said rear drive wheels and spaced further from said vehicle body than either of said rear drive wheels along the entire length of said second portion, with said single blade being fixedly mounted to the forward extremity of said second portion, said boom being free of structure spaced as close or closer to the vehicle than either of said rear drive wheels forwardly of said first portion of said boom;

said single blade being spaced outside the direction of travel of the one of said rear drive wheels adjacent thereto in a direction away from said vehicle body such that said blade is spaced further from said vehicle body than either of said rear drive wheels and said face of said blade being oriented at a substantial angle with respect to the direction of travel of said adjacent wheel;

means for raising and lowering said blade; and wherein said substantially circular water ring is formed in the soil by movement of said vehicle body in a generally circular direction of travel, causing said blade to push up said soil across said face of said blade and form said ring under observation of said operator.

2. The agricultural vehicle recited in claim 1 wherein said blade comprises a concave disk plow blade.

3. The agricultural vehicle recited in claim 1 wherein the peripheral bottom edge of said blade is positioned forward with respect to the peripheral top edge thereof.

4. An agricultural vehicle as recited in claim 1 wherein said raising and lowering means comprises means for raising said blade with said boom arm.

5. The apparatus recited in claim 4 wherein said raising and lowering means comprises:
- a spaced pair of struts, each strut pivotably coupled at one end to said first portion of said boom arm and pivotably coupled at the other end to said vehicle;
- a bracket vertically mounted on top of, and extending above said first portion of said boom arm between said pair of parallel struts;
- a third strut pivotably coupled at one end to the top of said bracket and at the other end to said vehicle; and
- means coupled to at least one of said struts for raising and lowering said boom arm.

6. The agricultural vehicle recited in claim 5 wherein said boom arm raising and lowering means comprises:
- at least one connecting rod pivotably coupled at one end to one of said pair of struts; and
- at least one swing arm coupled for rotation responsive to operation of said engine, said swing arm coupled to the other end of said connecting rod.

7. The agricultural vehicle recited in claim 6 further comprising shock absorbing means between said plow blade and said extremity of said boom arm.

8. The apparatus recited in claim 7 wherein said shock absorbing means comprises:
- a first plate coupled to the extremity of said boom arm and extending laterally with respect thereto;
- a second plate with said blade coupled thereto;
- a brace between said first and second plate; and wherein
- said first and second plates and said blade are joined together in a substantially triangular configuration.

9. The agricultural vehicle recited in claim 8 further comprising a bracket between said first and second portions of said boom arm.

* * * * *